Oct. 30, 1945.        C. LA HATTE        2,388,162
MEAT HOLDER
Filed April 17, 1944
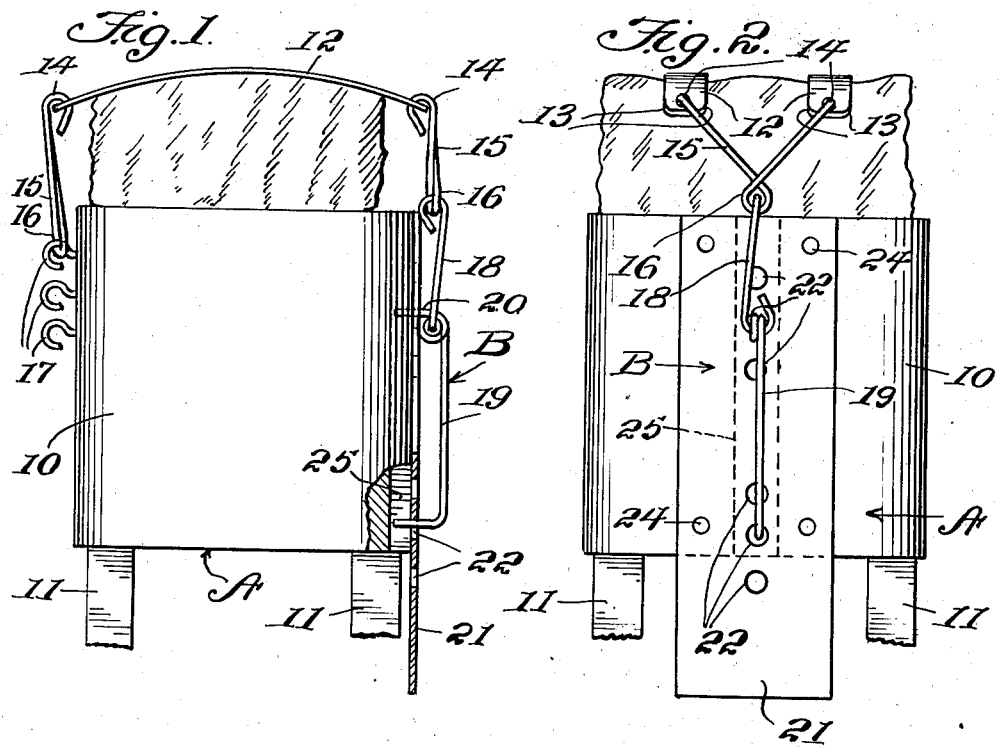
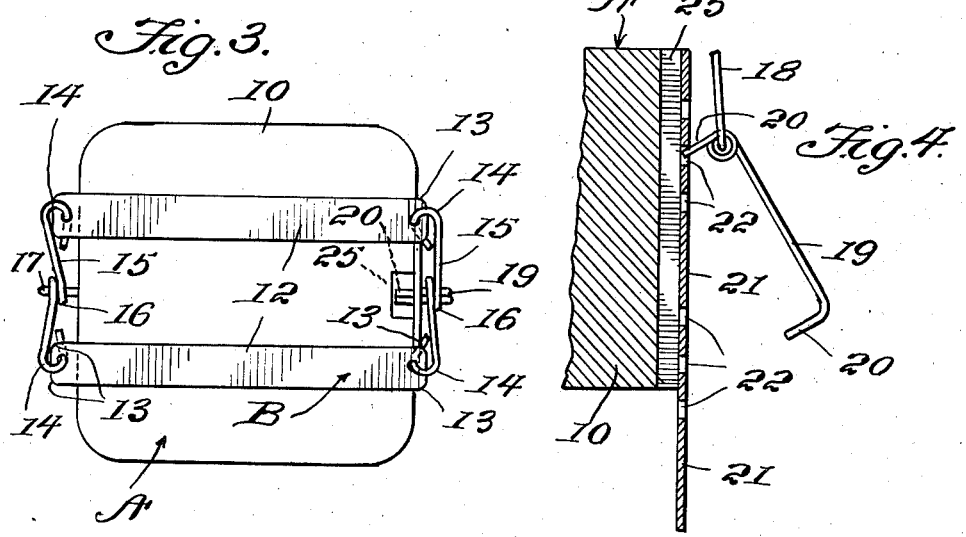
INVENTOR.
Cicero La Hatte,
BY
Victor J. Evans & Co.
ATTORNEYS Patented Oct. 30, 1945

2,388,162

UNITED STATES PATENT OFFICE 2,388,162

MEAT HOLDER

Cicero La Hatte, Vicksburg, Miss.

Application April 17, 1944, Serial No. 531,525

3 Claims. (Cl. 146—216)

The invention relates to a meat holder, and more especially to a holding device for meat blocks, benches, tables or the like.

The primary object of the invention is the provision of a device of this character, wherein a piece of meat to be cut or chopped can be conveniently held in a fixed position on the meat block, bench, table or the like, thereby giving the operator free use of the hands for the sawing, cutting, chopping or otherwise severing of a piece of meat so held.

Another object of the invention is the provision of a device of this character, wherein a piece of meat held thereby eliminates possible injury to an operator when cutting such meat resultant from accidental slipping thereof during the cutting or slicing operation thereon.

A further object of the invention is the provision of a device of this character, wherein meat of different sizes can very readily be held fast for the cutting thereof, the device being of novel construction so that it can be brought into holding position and released with dispatch, and in the use it avoids the spiking or pinning of the meat to a support as is now usual in meat stores or other vending places.

A still further object of the invention is the provision of a device of this character, which is simple in construction, thoroughly reliable and efficient in operation, strong, durable, readily and easily brought into workable position or released with dispatch, eliminates hand holding of the meat when being cut, it being out of the way when not in use, and inexpensive to manufacture and install.

With these and other objects in view, the invention consists in the features of construction, combination and arrangement of parts as will be hereinafter more fully described, illustrated in the accompanying drawing, which shows the preferred embodiment of the invention, and pointed out in the claims hereunto appended.

In the accompanying drawing:

Figure 1 is a fragmentary elevation of a meat block showing the device constructed in accordance with the invention applied thereto and in meat holding position.

Figure 2 is a view similar to Figure 1 looking toward another side thereof.

Figure 3 is a top plan view.

Figure 4 is a fragmentary vertical sectional view through the meat block and device with the latter in a releasing position.

Similar reference characters indicate corresponding parts throughout the several views in the drawing.

Referring to the drawing in detail, A designates generally a portion of a meat cutting stand having the usual upper cutting block 10 supported upon legs 11, only portions thereof being shown and this stand may be of any conventional construction, or in substitute therefor a table bench or the like may be employed, the stand being merely illustrated solely for the purpose of understanding the construction and manner of use of the device denoted generally at B, constituting the present invention, as will be hereinafter described in detail.

The device B which is a meat holder, comprises a pair of inherently springy saddling bands or strips 12 which are of uniform length, width and thickness with respect to each other. The bands or strips 12 are preferably formed with rounded end corners 13, and within these ends are loosely connected the closed eye terminals 14 of coupling links 15, each made from a single length of wire, although it may be otherwise constructed, and this wire is folded into substantially V-form creating medially thereof a center eye 16. The eye or skid loop 16 of one link 15 is adapted for detachable engagement with one of a vertical series of hanger hooks 17 which is made fast in the block 10 at one side thereof below the plane of meat supporting top thereof.

The eye 16 of the other link 15 has loosely connected thereto a latch attaching piece 18 carrying a loose double prong latching staple 19, the ends thereof being the prongs 20 thereof and this staple is preferably in the shape of an upset substantially U-form bail. On the side of the block 10 directly opposite that side carrying the hook or hanger 17 is vertically fixed a perforated keeper plate 21, the perforations 22 therein being selectively spaced apart from each other in a vertical direction, and any two of these are adapted to accommodate the prongs 20 of the staple 19, so that the strips or bands 12 can be secured in saddling and clamping relation to a piece of meat 23 resting on the block 10 for firmly holding the said meat fast thereon, whereby it may be cut or chopped, without hand holding of the same.

The staple 19 is adjustable in the plate 21 in conformity with the size of the meat to be held by the device on the stand or other support with which it is used. The staple is readily detached from the plate 21 at will and the device may then be moved out of the way for the use of the block clear thereof.

The plate 21 is made secure to the block by fasteners 24 engaged in these, the block 10 being provided with a clearance 25 for the prongs of the staple 19 when engaged with the plate.

The links 15 can be inherently resilient if found desirable to assist in exerting a pressure on the meat held by the device B to prevent slipping of such meat during the cutting thereof.

What is claimed is:

1. The combination with a meat cutting stand, a series of horizontally disposed attaching members carried by one side of the stand, a plurality of saddling bands connected at each end to the upper ends of a V-shaped link, said links being twisted at their meeting point to form eyes, one of said links being removably connected to one of said attaching members by means of a skid loop formed thereon and said saddling bands extending over the upper end of the stand, and attaching means carried by the V-shaped link on the opposite end of the saddling band and adapted to be secured at different levels to the side of the stand.

2. The combination with a meat cutting stand, a series of hooks arranged in a vertical line on one side of the stand, a plurality of saddling bands connected at each end to the upper ends of a V-shaped link, said links having their meeting points twisted to form eyes, one of said links being removably attached to one of the hooks and said saddling bands extending over the upper end of the stand, a hook carried by the V-shaped link on the opposite end of the saddling band and adapted to enter openings in the opposite side of the stand.

3. The combination with a meat cutting stand, a series of hooks carried by one side of the stand, a pair of saddling bands connected together at their ends by means of V-shaped links, the meeting point of said links being twisted to form eyes, one of said links connected to one end of the bands detachably connected to one of said hooks by means of said eye, a link connected to the eye of said link on the opposite ends of the bands, a hook carried by the lower end of the link, and the side of the stand having a series of openings adapted to receive said hook.

CICERO LA HATTE.